United States Patent [19]

Schierjott

[11] 4,371,918
[45] Feb. 1, 1983

[54] HIGH EFFICIENCY PUSH-PULL SATURATION CONVERTER

[75] Inventor: Rudolf Schierjott, Munich, Fed. Rep. of Germany

[73] Assignee: Siemens Aktiengesellschaft, Berlin & Munich, Fed. Rep. of Germany

[21] Appl. No.: 238,940

[22] Filed: Feb. 27, 1981

[30] Foreign Application Priority Data

Mar. 7, 1980 [DE] Fed. Rep. of Germany ....... 3008887

[51] Int. Cl.³ .......................................... H02M 3/335
[52] U.S. Cl. .................................................... 363/22
[58] Field of Search ................................. 363/22–27, 363/133, 134

[56] References Cited

U.S. PATENT DOCUMENTS

| | | | |
|---|---|---|---|
| 2,852,730 | 9/1958 | Magnuski | 363/22 |
| 3,327,244 | 6/1967 | Fay et al. | 363/22 X |
| 3,336,521 | 8/1967 | Russell | 363/24 |
| 3,629,682 | 12/1971 | Boelter | 363/23 |
| 3,818,312 | 6/1974 | Luursema et al. | 363/133 |
| 4,254,459 | 3/1981 | Belson | 363/134 X |

FOREIGN PATENT DOCUMENTS

| | | | |
|---|---|---|---|
| 1538987 | 2/1970 | Fed. Rep. of Germany | 363/22 |
| 309656 | 10/1971 | U.S.S.R. | 363/22 |
| 581557 | 12/1977 | U.S.S.R. | 363/23 |

OTHER PUBLICATIONS

Patel, "'V' Gap and Feedback Cure Switcher Core Saturation", Electronic Design, Dec. 6, 1980, pp. 81–84.

*Primary Examiner*—A. D. Pellinen
*Attorney, Agent, or Firm*—Hill, Van Santen, Steadman, Chiara & Simpson

[57] ABSTRACT

To increase the efficiency of a push-pull saturation converter, a choke is introduced in a common emitter circuit of switching transistors in the converter. In addition, a constriction may be provided in a center leg of a transformer core of a switching transformer within the converter. To further improve efficiency, an RC acceleration element may be provided in a base circuit for the switching transistors.

4 Claims, 3 Drawing Figures

4,371,918

1

HIGH EFFICIENCY PUSH-PULL SATURATION CONVERTER

BACKGROUND OF THE INVENTION

The invention relates to a push-pull saturation converter with two switching transistors alternately charging the primary circuit of a transformer with a DC voltage at the input of the push-pull saturation converter. The control inputs of these switching transistors is linked via a common base winding of the primary circuit at a voltage divider.

In switching converters, the conversion of one DC voltage into one or more electrically separated DC voltages is undertaken. Accordingly, the input DC voltage is reshaped into a rectangular voltage in the kilohertz range by means of fast switching transistors and is transmitted with the assistance of a transformer. The transformer serves for the electrical separation of the output and input circuits and, in Blocking Oscillator type converters, also serves for energy storage. In order to obtain the required output DC voltage, the secondary voltage of the transformer is recitified and filtered.

Essentially, three circuit designs are known for switching converters, these being employed depending upon the power range or the properties specifically required, namely single-ended converters, push-pull converters and push-pull saturation converters.

Single-ended converters are subdivided into single-ended flow converters and single-ended blocking converters whereby, given the single-ended flow converter, energy is transmitted via a diode into a choke in the load circuit during the conductive phase of the switching transistor and the choke then emits the stored energy via a free-running diode into the load circuit during the blocking phase of the switching transistor. In contrast thereto, given a single-ended blocking converter, energy is stored in the transformer during the conductive phase of the switching transistor and the transformer emits the stored energy into the load circuit via a diode in the blocking phase of the switching transistor.

The primary disadvantage of single-ended converters is the difficulty, given changes of load, of keeping a plurality of output voltages coupled out within a prescribed output voltage range. Moreover, a high expense for components is required and an efficiency of less than 80% is achieved in standard circuits. Since the short angle of current flow of said circuits effects high internal resistances of the output circuits, additional regulators must often be employed in the output circuits, such regulators signifying an additional expense and a further reduction of the efficiency.

In externally controlled push-pull converters, two switching transistors are switched in succession, shifted by half the period duration. When the first switching transistor is switched on, then the second blocks and current flows via a diode into a choke in the load circuit. When the second switching transistor is now switched on, a current flow then derives via a second diode and the choke in the load circuit. Due to this manner of operation, the transformer is magnetized in both directions. This means that the charges of induction are twice as high as in the single-ended flow and single-ended blocking converters, whereby a significantly increased output power derives. The symmetrical drive of the two switching transistors, however,

2 requires suitable control circuits with a considerable circuit expense.

With the third principle, that of push-pull saturation converters, two switching transistors are provided as in the push-pull converters. However, the switching transistors are linked with their bases via a common winding of the primary circuit and are driven via said winding which, for example, is linked via a voltage divider to the input voltage of the push-pull converter. Thereby, its function is such that the transistors with higher gain is first through-connected and then remains conductive via the base current impressed by means of the base winding until the transformer becomes saturated and the collector current of the transistor which is quickly increasing due to the drop of the inductance becomes so high that the base control current can no longer hold the transistor in saturation and the voltage at the transformer reverses due to the decreasing magnetic induction.

By so doing, the base voltage at the transistor with higher gain simultaneously becomes negative and the second transistor becomes conductive until, after renewed saturation of the transformer, the operation effects another reversal.

Push-pull saturation converters have an angle of current flow of nearly 360° and, thus low internal resistances. The attainable output power corresponds to those of externally controlled push-pull converters since the transformer also becomes magnetized in both directions here and a great change of induction thereby derives. Given constant input voltage, one obtains output voltages which are largely constant in a broad load range. If a plurality of output voltages are required, then these can be taken without further expense with rectifiers in accordance with the secondary windings. Circuit expense for the drive of the transistors is eliminated.

Despite these advantages and the favorable, low-cost realization, the use area of the saturation converter is limited to the transmission of small powers with a low degree of efficiency. The cause of these limitations are the problems in the switching operation of the power transistors. Since the transformer is almost suddenly placed in saturation, the collector current in the current-conducting transistor increases very quickly. As a result of a base current excess, said transistor is in the saturation state at this time and, since it continues to be supplied with base current, a relatively long storage time passes until the shutdown is initiated due to the increase of the collector-emitter voltage. A disproportionately high collector peak current arises which cannot only dangerously overload the transistors but, above all results in high switching losses. Moreover, the high peak currents effect strong voltage fluctuations at the input and output of the converter as well as potent, high-frequency disruptions which make the elimination of radio interference difficult. The energy content of the current peak is intermediately stored in the leakage inductance of the transformer and is subsequently fed back into the input circuit on the one hand, which effects dangerously high voltage peaks at the shutoff transistor, and, on the other hand is fed to the output circuits, whereby output voltages undesirably increase, particularly given small load. Since the current peaks of both transistors are usually of different height, a great asymmetry is caused in the transformer, this effecting an unequal load distribution to the output diodes and switching transistors and causing undesired voltage waviness or ripple in the outputs.

SUMMARY OF THE INVENTION

Proceeding from the principle of the push-pull saturation converter, an object of the invention is to offer a push-pull saturation converter with high efficiency and high power given low expense for parts.

This object is inventively achieved in that a choke with a diode connected in parallel is arranged in the common emitter circuit of the switching transistors. Given a particularly advantageous embodiment of the invention, the leg of the transformer core having the transformer windings exhibits at least one notch-like shaping constricting the cross section of the central leg.

Due to the special grinding of the center leg of the transformer, the weakened part of the center leg becomes saturated first and the magnetization current in the transformer slowly increases. The choke in the common emitter line of the switching transistors increases the voltage drop at the beginning of saturation. This voltage drop opposes the base voltage of the transistor which is now conductive and already effects a clearance of the base at the beginning of the transformer saturation.

An acceleration element consisting of a resistor with a series connected capacitor is allocated to the base circuit of the switching transistors in a further embodiment of the invention.

Due to the acceleration element, the shutdown operation is further strengthened, which also has an effect in the switching-on. Also, due to the acceleration element, the transistors are operated with low turn-on losses and the elimination of the current peaks thus considerably facilitates the elimination of radio interference. A sure balancing of the transistor currents and core induction is achieved via the choke. The diode connected in parallel serves for the reset magnetization of the choke.

The magnetic reversal losses in the transformer are greatly reduced in an advantageous manner by means of the leg grinding, since the core is fully driven only at the prescribed location in the center leg.

DESCRIPTION OF THE PREFERRED EMBODIMENTS

Figure 1:
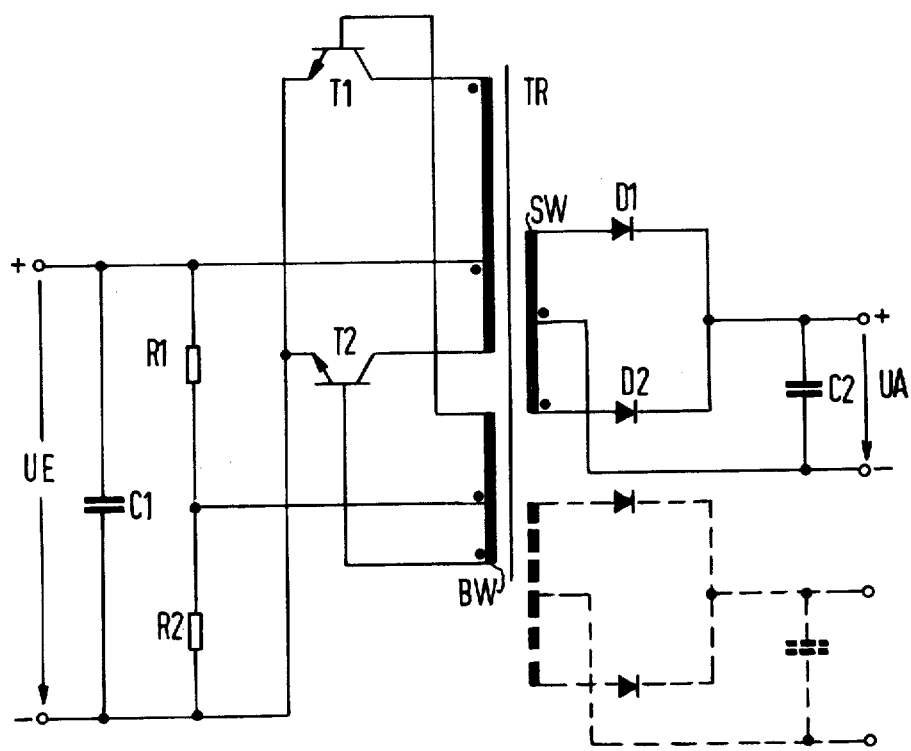
FIG. 1 is a schematic illustration of a known push-pull saturation converter.

Given the known push-pull saturation converter illustrated in FIG. 1, an input DC voltage UE is converted into a DC voltage UA electrically separated from the input voltage. It consists of a transformer TR which is driven by switching transistors T1 and T2 arranged in its input circuit. Its function is set forth below.

The input voltage UE present at a capacitor C1 generates a base current via a resistor R1 and a base winding BW linking the bases of the transistors T1 and T2. The transistor with the higher gain, in this case the transistor T1, becomes conductive and remains conductive via the basic current impressed by means of the base winding BW and a resistor R2 until the transformer becomes saturated and the collector current of the transistor T2, which quickly rises due to the drop of the inductance, becomes so high that the base control current can no longer keep the transistor T1 in saturation and the voltage at the transformer reverses due to the descreasing magnetic induction. By so doing, the base voltage of T1 becomes negative at the same time and the transistor T2 becomes conductive until, after renewed saturation of the transformer, the operation effects another reversal at the transistor T1.

Given a conductive transistor T1, the diode D1 adjacent to the secondary winding is conductive at the same time, and thus emits energy to the output UA with its smoothing capacitor C2. The same applies to the diode D2 when the transistor T2 is conductive. In operation, the resistor R1 is generally shut off for reasons of saving power.

In addition to the illustrated output UA, a plurality of outputs is also possible (illustration with broken lines).

Figure 2:
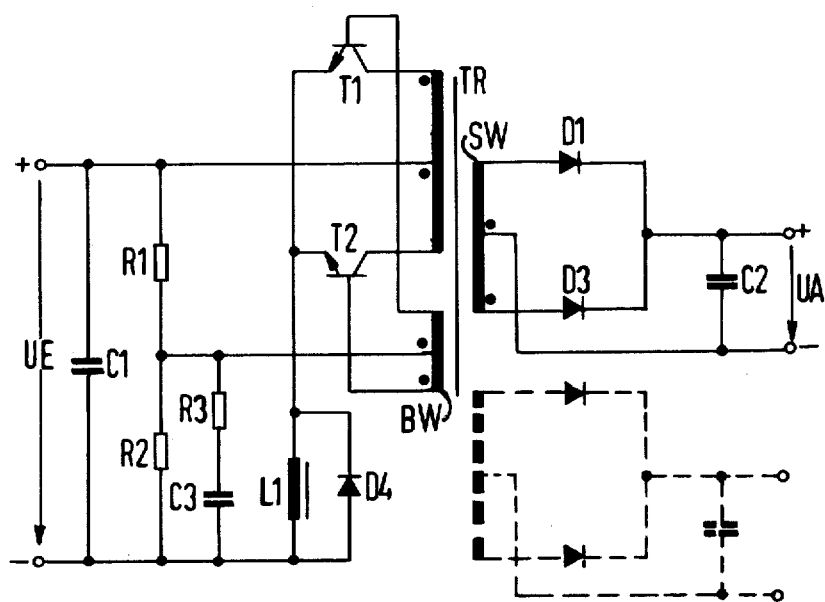
FIG. 2 is a schematic illustration of the push-pull saturation converter of the invention.
Figure 3:
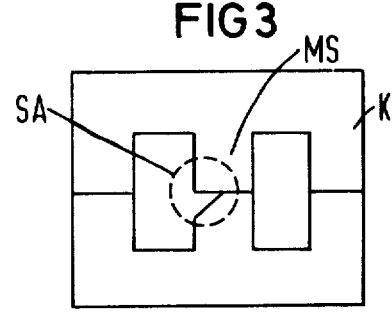
FIG. 3 is a schematic illustration of the transformer core employed in the push-pull saturation converter of the invention.

Proceeding from the push-pull saturation converter principle illustrated in FIG. 1, one arrives at the high efficiency push-pull saturation converter illustrated in FIG. 2. To this end, the push-pull saturation converter is provided with a transformer core, said core being illustrated in FIG. 3. In this transformer core K, the center leg MS which bears the windings of the transformer is provided with a special grinding. The core itself, thereby is composed of two E-shaped individual elements which, abutting in flush fashion, form the overall core. In addition to this feature, a large choke L1 with a diode D4 connected in parallel is situated in the emitter circuit of the switching transistors T1 and T2 and, moreover, an acceleration element consisting of a resistor R3 with a following capacitor C3 is provided in the base circuit coupled to the base winding BW.

Building on the push-pull saturation converter described in FIG. 1, the function of the high efficiency push-pull saturation converter is as follows. That part of the transformer weakened due to the grinding of the center leg MS becomes saturated first, given a switching transistor T1 which is conductive. However, the magnetization current in the transformer rises relatively slowly since the drop of inductance in the transformer proceeds rather slowly due to the clipped permeability. The choke L1 which, moreover, is dimensioned such that the magnetization current of the air gap-free transformer does not yet effect a significant voltage drop since it increases its voltage drop as soon as the current rises strongly in the transformer, i.e., at the beginning of the saturation. This voltage drop opposes the base voltage of the conductive transistor T1 and already effects a clearance of the switching transistor at the beginning of the transformer saturation. The shut-down operation initiated in such manner is strengthened by the acceleration element R3, C3 and leads to very short shut-down times with small voltage peaks of approximately 1.1 to 1.3 times the operating current. In the change-over operation of the transistor T2, the acceleration element, moreover, effects a rapid turn-on of the following, current-conducting transistor T2 with a high base current and, thereby effects low turn-on losses. It is thus possible to employ cost-favorable transistors since the demands made of peak current, switching speed, and power dissipation are low.

The choke L1 effects a sure balancing of the diodes and of the transistor currents, even given half waves which are unequally loaded. Accordingly, the diode D4 serves for the reset magnetization of the choke L1.

The magnetization reversals in the transformer are greatly reduced since the core is fully driven only at an intentional weak spot in the leg. By so doing, the electromagnetic emission is simultaneously reduced.

By means of a suitable grinding of the core, the operating frequency of the converter can be varied within wide limits, since the remaining air gap-free cross section is approximately proportional to the reciprocal switching frequency.

Moreover, given short-circuit of the outputs, the circuit is self-protective due to the termination of the oscillation.

The elimination of radio interference is greatly facilitated by means of the dismantling of the current peaks; likewise, the voltage peaks at the output circuits and the transistors produced due to the energy stored in the leakage inductance are reduced to a minimum. There thus derive DC voltage converters with a high degree of efficiency (approximately 90%), low internal resistance and minimal space requirements given operating frequencies of 20-100 kHz.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A push-pull saturation converter, comprising: a transformer having a primary winding, a base winding, and a secondary winding; two switching transistors connected to alternately charge the primary circuit of the transformer with a DC voltage; bases of said switching transistors being linked via the common base winding of the primary circuit; a choke with a diode connected in parallel being disposed in a common emitter circuit of the switching transistors; and a center leg of a core of the transformer bearing the winding of the transformer having at least one notch-like shaping restricting a cross section of a center leg of the core.

2. A push-pull saturation converter according to claim 1, wherein an acceleration element comprising a series connection of a resistor with a following capacitor has one end connected to a base circuit associated with the switching transistors through the base winding and the other end is connected to a reference terminal.

3. A converter according to claim 2 wherein the base circuit comprises a voltage divider, an output of the voltage divider having said resistor and capacitor series connected in parallel thereacross, said output connecting to the base winding.

4. A push-pull saturation converter, comprising: a switching transformer having two primary windings and a secondary winding; a switching transistor connected at each end of a first of the primary windings by its collector; a common emitter connection of the two switching transistors connecting through a choke and diode to one input terminal of a DC input for the converter; a base of each switching transistor connecting to respective ends of the secondary primary winding; a second input terminal of said DC input connecting to the first primary winding and also through a voltage divider to the second primary winding; the output of the voltage divider having a series connected resistor and capacitor connected thereacross; and a center leg of a core of the switching transformer having a flux restriction therein.

* * * * *